United States Patent [19]

Tunooka et al.

[11] Patent Number: 4,585,745
[45] Date of Patent: Apr. 29, 1986

[54] DIELECTRIC CERAMIC COMPOSITION FOR HIGH FREQUENCY PURPOSES

[75] Inventors: Tutomu Tunooka; Fumio Mizuno, both of Nagoya, Japan

[73] Assignee: NGK Spark Plug Co., Japan

[21] Appl. No.: 681,947

[22] Filed: Dec. 14, 1984

[30] Foreign Application Priority Data

Dec. 16, 1983 [JP] Japan .................... 58-238630

[51] Int. Cl.$^4$ .................................... C04B 35/00
[52] U.S. Cl. .................................... 501/135
[58] Field of Search .................... 501/136, 135

[56] References Cited

U.S. PATENT DOCUMENTS 2,961,327 11/1960 Goodman .................... 501/135
4,319,485 3/1982 Terada et al. .................... 73/336

FOREIGN PATENT DOCUMENTS 53-60541  5/1978  Japan .................... 501/135
58-60660  4/1983  Japan .
58-60661  4/1983  Japan .
59-147474 8/1984  Japan .................... 501/135

Primary Examiner—Helen M. McCarthy
Attorney, Agent, or Firm—Darby & Darby

[57] ABSTRACT

A dielectric ceramic composition, which has a high dielectric constant, low loss and stable temperature characteristics suited for the microwave frequency range, is obtained by the present invention. The dielectric ceramic composition according to the present invention is expressed as $(Ba_xSr_{1-x})(Ni_{1/3}Nb_{2/3})O_3$ and with a mole fraction range of $0 \leq x < 1$.

1 Claim, No Drawings

DIELECTRIC CERAMIC COMPOSITION FOR HIGH FREQUENCY PURPOSES

BACKGROUND OF THE INVENTION

1. Field of the Invention

This invention relates to a dielectric ceramic composition, which has purposes for a microwave frequency range, particularly a frequency range above the X-band and has a high dielectric constant, a high unloaded Q and stable temperature characteristics in such high frequency ranges.

2. Description of the Prior Art

With recent development of communication networks the operating frequency range is increased up to the microwave range. In this connection, a dielectric ceramic is finding such applications as impedance matching in dielectric resonators, microwave integrated circuit substrates and various microwave circuits in the microwave frequency range. Particularly, its demand is recently increasing for the purposes of frequency stabilization of filters, guns and FET microwave oscillators. In the meantime, there is a recent trend for smaller sizes of microwave circuits. The size of the microwave circuit depends on the wavelength of a propagating electromagnetic wave. The wavelength of the electromagnetic wave propagating through a microwave circuit utilizing a dielectric is given as $\lambda_0/\sqrt{\epsilon}$ where $\lambda_0$ is the wavelength of the wave propagating through vacuum and $\epsilon$ is the relative dielectric constant. This means that the higher $\epsilon$ is, the smaller circuit element can be realized. For this reason, there is a strong demand for a dielectric ceramic composition, which causes low loss, has stable temperature characteristics and has a high dielectric constant.

Prior art dielectric ceramic materials include $ZrO_2$-$SnO_2$-$TiO_2$, $BaO$-$TiO_2$, partly substituted for by different elements, dielectric ceramic having positive temperature coefficient of the relative dielectric constant and mixtures of glass and $TiO_2$, with the temperature coefficient of the relative dielectric constant thereof being negative, for providing controlled temperature coefficients of the relative dielectric constant. These materials, however, have various problems, e.g., low relative dielectric constant, low unloaded Q and incapability of providing a desired temperature coefficient.

SUMMARY OF THE INVENTION

The present invention has an object to provide a dielectric ceramic composition, which is free from the above difficiencies and has a high dielectric constant, low loss and stable temperature characteristics suited for the microwave frequency range. The dielectric ceramic composition according to the present invention is expressed as $(Ba_xSr_{1-x})(Ni_{1/3}Nb_{2/3})O_3$ and mole fraction range of $0 \leq x < 1$.

The foregoing information and sample are presented herein for illustrative purpose only and are not intended to unduly limit the scope of the invention.

DETAILED DESCRIPTION OF THE INVENTION

Test values obtained with the composition according to the present invention are given below.

SAMPLES $BaCO_3$, $SrCO_3$, $Nb_2O_5$ and $NiO$ were weighed in accordance with the composition noted above and were mixed together with added water using a ball mill, pre-reacted at 1,000° C. for 2 hours, and milled with balls before formation into disks, which were then sintered in a temperature range of 1,400° to 1,600° C. for 2 hours. The sintered disks were then polished to a predetermined shape.

TEST VALUES

Parameters as listed in a Table below were measured with x in the formula $(Ba_xSr_{1-x})(Ni_{1/3}Nb_{2/3})O_3$ in a range of 0 to 1.00. The temperature coefficient of resonant frequency was measured in a temperature range of +25° C. to +85° C. and is given as $$\tau_f = -\tfrac{1}{2}\tau_\epsilon - \alpha$$

where $\tau_\epsilon$ is the temperature coefficient of the dielectric constant, and $\alpha$ is the linear thermal expansion coefficient of the sample of ceramic.

TABLE

| x | Sintering temperature °C. | Relative dielectric constant $\Sigma$ at 9GHz | Unloaded Q | Temperature coefficient $\tau_f$ of resonant frequence (ppm/°C.) | Linear thermal expansion coefficient $\alpha$ (ppm/°C.) |
|---|---|---|---|---|---|
| 0 | 1600 | 31.17 | 3180 | −30 | 9.9 |
| 0.1 | 1550 | 32.56 | 3350 | −18 | 11.7 |
| 0.2 | 1550 | 32.60 | 3900 | −14 | 10.2 |
| 0.3 | 1550 | 33.71 | 5600 | +1 | 9.1 |
| 0.4 | 1550 | 35.35 | 9300 | +3 | 9.0 |
| 0.5 | 1550 | 38.26 | 7630 | +6 | 9.1 |
| 0.6 | 1500 | 38.53 | 6300 | +9 | 8.9 |
| 0.7 | 1500 | 34.70 | 3600 | +12 | 9.4 |
| 0.8 | 1500 | 31.76 | 3300 | +14 | 9.5 |
| 0.9 | 1500 | 31.62 | 3300 | +21 | 9.3 |
| 1.0 | 1450 | 30.88 | 4000 | +35 | 9.6 |

RESULTS

As is obvious from the Table above, the temperature coefficient of the resonant frequency lies in a range of $0 \pm 30$ ppm/°C. with x in a range of $0 \leq x < 1$. Besides, the temperature coefficient $\tau_f$ of resonant frequency can be controlled continuously. For x=1, however, the value of $\tau_f$ is too high for practical purposes. From the results shown in the Table, it was confirmed that the ceramic composition according to the present invention has low temperature dependency and is stable. It was also confirmed that the relative dielectric constant $\epsilon$ at 9 GHz is above 30 with any value of x, meeting the requirement for use in the microwave frequency range. The unloaded Q was above 3,000 with x in a range of $0 \leq x \leq 1$.

No particular effects could be obtained by increasing the sintering time. Rather, a higher bulk density could be obtained by setting the sintering time to about 2 hours.

As has been made obvious from the above test results, with the dielectric ceramic composition according to the present invention, the temperature dependency is low as is seen from the values of the temperature coefficient of resonant frequency as given above, and also the relative dielectric constant $\epsilon$ at 9 GHz is higher than 30 with any value of x. Further, the unloaded Q is suitable for practical purposes. It is thus obvious that the dielectric composition material according to the present invention has a low temperature coefficient, a high dielectric constant and a high unloaded Q and is thus suitable for use in the microwave frequency range, particularly in a frequency range above the x-band.

What is claimed is:

1. A dielectric ceramic composition for high frequency purposes wherein said dielectric ceramic composition for high frequency purposes is expressed by a formula $(Ba_xSr_{1-x})(Ni_{1/3}Nb_{2/3})O_3$ and with a mole fraction range of $0 \leq x < 1$.

* * * * *